United States Patent
Abate

(10) Patent No.: US 10,516,632 B2
(45) Date of Patent: Dec. 24, 2019

(54) SWITCHABLE MODES FOR MESSAGING

(71) Applicant: Microsoft Technology Licensing, LLC, Redmond, WA (US)

(72) Inventor: Umberto Abate, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 16/006,684

(22) Filed: Jun. 12, 2018

(65) Prior Publication Data

US 2018/0295075 A1    Oct. 11, 2018

Related U.S. Application Data

(63) Continuation of application No. 14/448,822, filed on Jul. 31, 2014, now Pat. No. 10,021,044.

(51) Int. Cl.
| | |
|---|---|
| *G06F 3/048* | (2013.01) |
| *H04L 12/58* | (2006.01) |
| *G06F 3/0481* | (2013.01) |
| *G06Q 10/10* | (2012.01) |
| *H04M 1/725* | (2006.01) |

(52) U.S. Cl.
CPC ............ *H04L 51/04* (2013.01); *G06F 3/0481* (2013.01); *G06Q 10/107* (2013.01); *H04L 51/046* (2013.01); *H04M 1/72552* (2013.01); *H04M 1/72563* (2013.01)

(58) Field of Classification Search
CPC ..... H04L 51/04; H04L 51/046; G06F 3/0481; G06Q 10/107; H04M 1/72552
USPC ........................................................ 715/753
See application file for complete search history.

(56) References Cited

U.S. PATENT DOCUMENTS

| | | | |
|---|---|---|---|
| 8,762,475 B2 * | 6/2014 | Cheung | H04L 51/04 709/207 |
| 9,584,453 B2 | 2/2017 | Taylor et al. | |
| 9,800,525 B1 * | 10/2017 | Lerner | H04L 51/00 |
| 2002/0152299 A1 | 10/2002 | Traversat et al. | |

(Continued)

FOREIGN PATENT DOCUMENTS

| | | |
|---|---|---|
| CN | 102780650 A | 11/2012 |
| CN | 102868977 A | 1/2013 |

(Continued)

OTHER PUBLICATIONS

"Final Office Action Issued in U.S. Appl. No. 14/448,955", dated Oct. 1, 2018, 23 Pages.

(Continued)

*Primary Examiner* — David Phantana-angkool
(74) *Attorney, Agent, or Firm* — Schwegman Lundberg & Woessner, P.A.

(57) ABSTRACT

Techniques for switchable modes for messaging are described. In various implementations, a software application for messaging includes a conversation mode and an engagement mode each representing different respective modes for presenting a message. The engagement mode, for instance, provides a larger portion of an available display area for the message than the conversation mode. According to one or more implementations, switching between the conversation mode and the engagement mode is based on a user behavior indicating a level of engagement of a user relative to the application.

20 Claims, 5 Drawing Sheets

Conversation Mode

Engagement Mode (first embodiment)

(56) References Cited

U.S. PATENT DOCUMENTS

| | | | | |
|---|---|---|---|---|
| 2008/0250107 | A1* | 10/2008 | Holzer | H04L 12/1831 709/206 |
| 2009/0043856 | A1* | 2/2009 | Darby | H04L 51/04 709/206 |
| 2009/0157825 | A1* | 6/2009 | Barbee | G06Q 10/107 709/206 |
| 2010/0158097 | A1 | 6/2010 | Pascal et al. | |
| 2010/0325222 | A1 | 12/2010 | Taylor et al. | |
| 2011/0106736 | A1 | 5/2011 | Aharonson et al. | |
| 2014/0195933 | A1* | 7/2014 | Rao DV | H04L 51/046 715/758 |
| 2015/0263996 | A1* | 9/2015 | Abate | H04L 51/04 715/753 |
| 2015/0263997 | A1* | 9/2015 | Abate | H04L 51/046 715/753 |

FOREIGN PATENT DOCUMENTS

| | | |
|---|---|---|
| CN | 102932241 A | 2/2013 |
| CN | 102981712 A | 3/2013 |

OTHER PUBLICATIONS

"Office Action Issued in Chinese Patent Application No. 201580014043. 8", dated Sep. 5, 2018, 10 Pages.

"Office Action Issued in Chinese Patent Application No. 201580014272. X", dated Sep. 20, 2018, 14 Pages.

"Advisory Action Issued in U.S. Appl. No. 14/448,955", dated Jan. 7, 2019, 3 Pages.

"Non Final Office Action Issued in U.S. Appl. No. 14/448,955", dated Apr. 1, 2019, 25 Pages.

U.S. Appl. No. 14/448,822, filed Jul. 31, 2014, Instant Messaging, U.S. Pat. No. 10,021,044.

* cited by examiner

SWITCHABLE MODES FOR MESSAGING

RELATED APPLICATIONS

This application is a continuation of and claims priority to U.S. patent application Ser. No. 14/448,822, filed Jul. 31, 2014, entitled "Instant Messaging", which claims priority under 35 USC § 119 or § 365 to Great Britain Patent Application No. 1404617.1, filed Mar. 14, 2014, entitled "Instant Messaging", the disclosures of which are incorporate in their entirety.

BACKGROUND

Instant messaging provides real-time communication between two or more users over a communication system. The communication is primarily text-based but can also involve communication based on file transfer and selectable hyperlinks etc. In order to engage in instant messaging, each user executes a client at a user device in the communication system. The client is a piece of software which is distributed to the users and which, when executed at a user device in the communication system, allows the user to engage in instant messaging over the communication system. Users can engage in instant messaging conversations over the communication system in which instant messages are transmitted between them. An instant messaging communication session between the users' respective user devices may be established and the messages may be transmitted between the user devices in the instant messaging communication session via a communication network of the communication system. The instant messaging conversation may include two or more users and the instant messaging communication session may include two or more user devices.

As an example, a first user at a first user device executing a first client may engage in an instant messaging conversation with a second user at a second user device executing a second client. Messages can be transmitted in both directions between the first and second clients in an instant messaging communication session between the first and second devices. The transmitted messages constitute a temporal sequence of messages. The first user can input a text message to a first client executed at his user device and the first client can transmit the text as a message to a second client at the second user device. The second client can interpret the instant message and display the text message to the second user.

During the conversation, the first user can also select an option presented by the first client to transfer a file to the second user and the first client can transmit a notification message in the instant messaging communication session to notify the second user of the file transfer. The file may be a media file such as an audio file, video file or (static/still) image file. Transmission of the file itself may begin automatically or may begin in response to the second user selecting an option to accept the file transfer. Once transmitted, the second user may select an option to save or open the transmitted file, for instance an option to play a media file in a media application executed on the second device.

The time taken for the transmission of messages which contain only text over the communication system in the instant messaging communication session is short enough (e.g. ≤2 seconds) for the users to perceive the communication as occurring in real-time and to be able to maintain an interactive conversation; messages containing media files may take longer due to their increased bit-size. The clients at the first and second user devices can store the instant messages that have been transmitted (and received) during the conversation. In this way, the first client can maintain a conversation history at the first user device of instant messages sent in conversations in which the first user has engaged. This allows the first user to retrieve instant messages from previous conversations at the first user device. Similarly, the second client can maintain a conversation history at the second user device of instant messages sent in conversations in which the second user has engaged. This allows the second user to retrieve instant messages from previous conversations at the second user device. The conversation history may be displayed by displaying transmitted and received messages in sequence (that is, according to the temporal order in which they were transmitted and received). The conversation histories can include file transfers which occurred in past and present instant messaging communication sessions.

SUMMARY

Techniques for switchable modes for messaging are described. In various implementations, a software application for messaging includes a conversation mode and an engagement mode each representing different respective modes for presenting a message. The engagement mode, for instance, provides a larger portion of an available display area for the message than the conversation mode. According to one or more implementations, switching between the conversation mode and the engagement mode is based on a user behavior indicating a level of engagement of a user relative to the application.

In the following, a user device comprises a display having an available display area, a network interface, and one or more processors. The network interface is configured to transmit and receive messages between the user device and a communication network in an instant messaging communication session. The messages constitute a sequence of messages in which a user of the user device is engaged by instigating transmission of new messages in response to receipt of received messages in the communication session. The one or more processors are configured to run a client application having a user interface. The user interface is capable of operating in a conversation mode to display one or more of the messages in the available display area or in an engagement mode to display one or more of the messages, each displayed message in the engagement mode occupying a larger respective proportion of the available display area than in the conversation mode. The client application is configured to detect a condition indicative of the level of engagement of the user by analyzing the user's activity at the user device. Responsive to the detected condition, the client application is configured to modify the client user interface, when configured to operate in one of said modes, to operate in the other of said modes instead.

Also disclosed are a corresponding method performed by said client application, and a computer readable medium configured to store said client application which constitutes a computer program product.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF DRAWINGS

For a better understanding of the present subject matter and to show how the same may be carried into effect, reference will now be made by way of example to the accompanying drawings in which.

DETAILED DESCRIPTION

Embodiments will now be described by way of example only.

In the described embodiments, a communication client running on a user device has a client interface which displays transmitted and received messages of an instant messaging communication session in an available display area of a display. The transmitted messages constitute a temporal sequence of messages which are stored at the user device. The client user interface can operate in one of at least two modes. The first mode is a conversation mode in which each of the transmitted and received messages is displayed in sequence in a manner similar to that of known communication clients. The second mode is an engagement mode in which only one received message of the sequence is displayed via the client user interface along with at most one additional message of the sequence (e.g. the most recently transmitted message of the sequence)—no other messages of the sequence are displayed. That is, at least one but no more than two transmitted and/or received messages of the sequence are displayed in the engagement mode.

The displayed messages are enlarged in the engagement mode relative to the conversation mode; that is, the most recently received message of the sequence and the additional message of the sequence (when displayed) occupy greater respective portions of the available display area in the engagement mode than they occupy in the conversation mode.

The engagement mode is thus well suited to displaying additional "rich media" content relating to the one transmitted and the one displayed message which is not displayed in the conversation mode. For instance, media content such as images or video extracted those messages themselves may be displayed via the client user interface in the engagement mode (but not in the conversation mode) and/or local media content such as locally stored images and/or videos (such as icons, graphics and various fonts) may be selected to complement those messages and displayed in the engagement mode (but not in the conversation mode).

Figure 1:
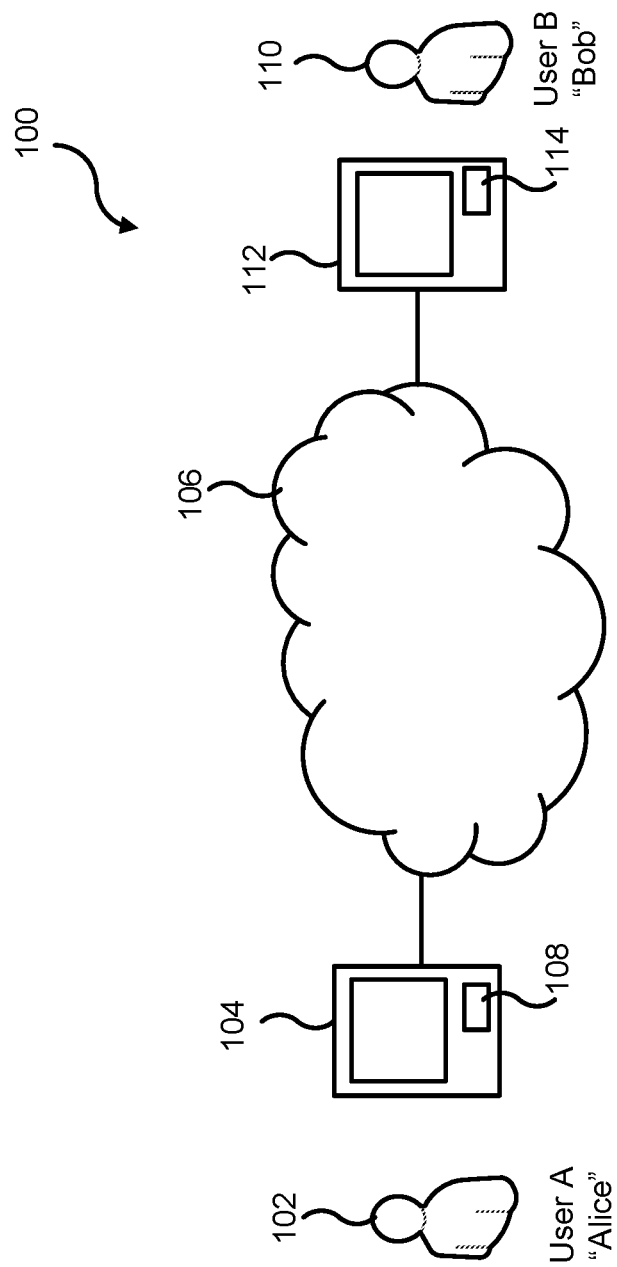
FIG. 1 is a schematic illustration of a communication system.

Reference is first made to FIG. 1, which illustrates a packet-based communication system 100. A first user 102 of the communication system (User A or "Alice" 102) operates a user device 104, which is shown connected to a communications network 106. The communications network 106 may for example be the Internet. The user device 104 may be, for example, a mobile phone (e.g. smartphone), a personal digital assistant ("PDA"), a personal computer ("PC") (including, for example, Windows™, Mac OS™ and Linux™ PCs), a gaming device, tablet computing device or other embedded device able to connect to the network 106. The user device 104 is arranged to receive information from and output information to the user 102 of the device. The user device 104 comprises a display such as a screen and an input device such as a keypad, joystick, touchscreen, keyboard, mouse, microphone and/or webcam.

Note that in alternative embodiments, the user device 104 can connect to the communication network 106 via additional intermediate networks not shown in FIG. 1. For example, if the user device 104 is a mobile device, then it can connect to the communication network 106 via a cellular mobile network (not shown in FIG. 1), for example a GSM or UMTS network.

The user device 104 is running a communication client 108, provided by the software provider associated with the communication system 100. The communication client 108 is a software program executed on a local processor in the user device 104 which allows the user device 104 to engage in calls and instant messaging communication sessions over the network 106.

FIG. 1 also shows a second user 110 (User B or "Bob") who has a user device 112 which executes a client 114 in order to communicate over the network 106 in the same way that the user device 104 executes the client 108 to communicate over the network 106. Therefore users A and B (102 and 110) can communicate with each other over the communications network 106. There may be more users connected to the communications network 106, but for clarity only the two users 102 and 110 are shown connected to the network 106 in FIG. 1.

Each communication client instance 104, 112 has a log in/authentication facility which associates the user devices 104, 112 with their respective users 102, 110 e.g. by the user entering a username and password at the client and which is verified against user account data stored at a server (or similar) of the communication system 100 to as part of an authentication procedure. Users can have communication client instances running on other devices associated with the same log in/registration details.

In the case where the same user, having a particular username, can be simultaneously logged in to multiple instances of the same client application on different devices, back-end server 120 is arranged to map the username (user ID) to all of those multiple instances but also to map a separate sub-identifier (sub-ID) to each particular individual instance. Thus the communication system is capable of distinguishing between the different instances whilst still maintaining a consistent identity for the user within the communication system.

User 102 is logged-in (authenticated) at client 108 of device 104 as "User A". User 112 is logged-in (authenticated) at client 114 of device 114 as "User B".

Figure 2:
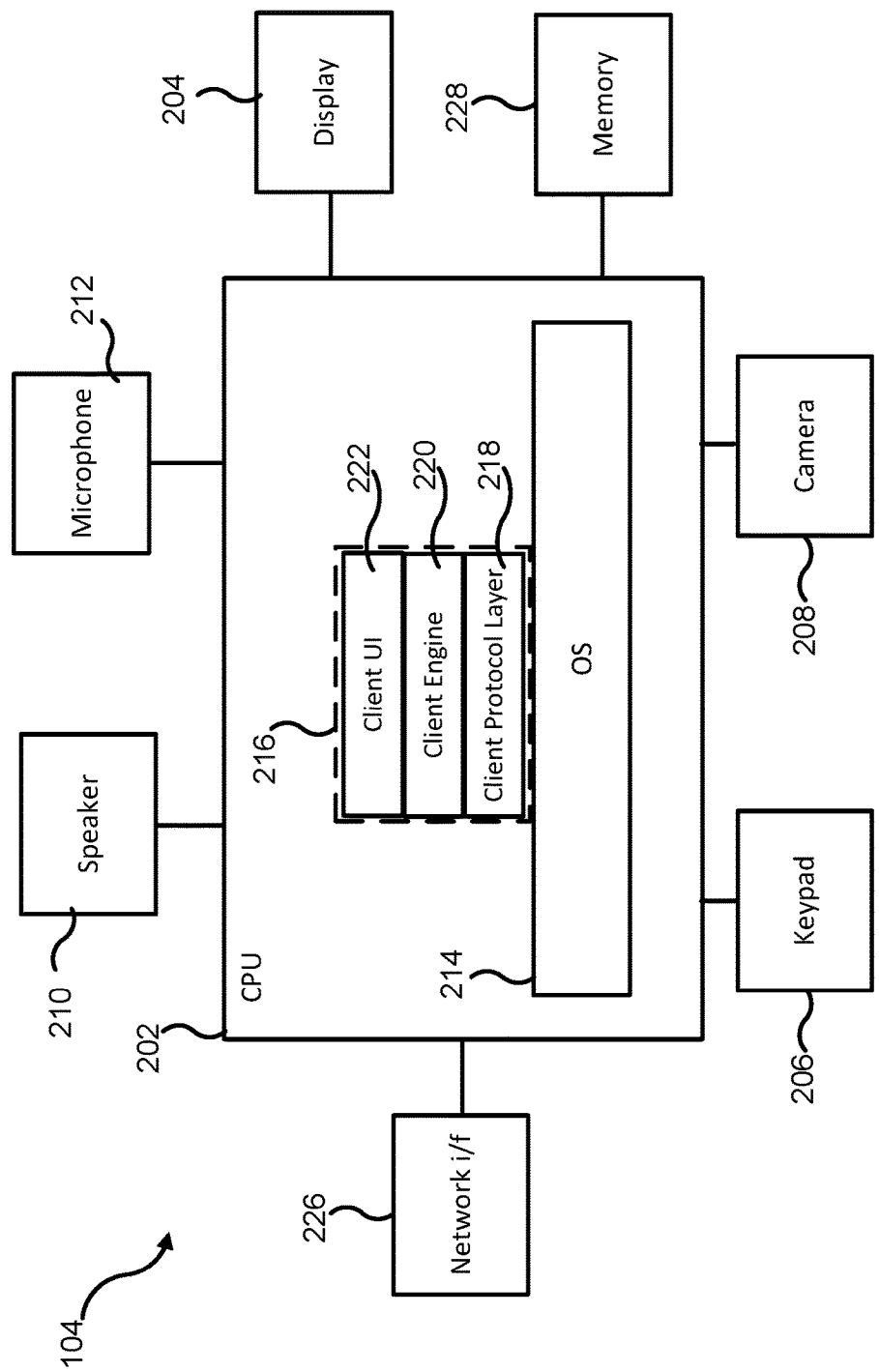
FIG. 2 is a schematic block diagram of a user device.

FIG. 2 illustrates a detailed view of the user device 104 on which is executed client 108. The user device 104 comprises a central processing unit ("CPU") 202, to which is connected a display 204 such as a screen, input devices such as a keypad (or a keyboard) 206 and a camera 208 for capturing video data. The display 204 may comprise a touchscreen for inputting data to the CPU 202. An output audio device 210 (e.g. a speaker) and an input audio device 212 (e.g. a microphone) are connected to the CPU 202. The display 204, keypad 206, camera 208, output audio device 210 and input audio device 212 are integrated into the user device 104. In alternative user devices one or more of the display 204, the keypad 206, the camera 208, the output audio device 210 and the input audio device 212 may not be integrated into the user device 104 and may be connected to the CPU 202 via respective interfaces. One example of such an interface is a USB interface. The CPU 202 is connected to a network interface 226 such as a modem for communication with the communications network 106 for communicating over the communication system 100. The network interface 226 may be integrated into the user device 104 as shown in FIG. 2. In alternative user devices the network interface 226 is not integrated into the user device 104.

FIG. 2 also illustrates an operating system ("OS") 214 executed on the CPU 202. Running on top of the OS 214 is a software stack 216 for the client 108. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 226. The client protocol layer 218 of the client software communicates with the operating system 214 and manages the connections over the communication system 100. Processes requiring higher level processing are passed to the client engine layer 220. The client engine 220 also communicates with the client user interface layer 222. The client engine 220 may be arranged to control the client user interface layer 222 to present information to the user via a user interface of the client and to receive information from the user via the user interface.

FIG. 2 shows one CPU but alternative user devices may comprise more than one CPU e.g. which constitute cores of a multi-core processor.

Figure 3:
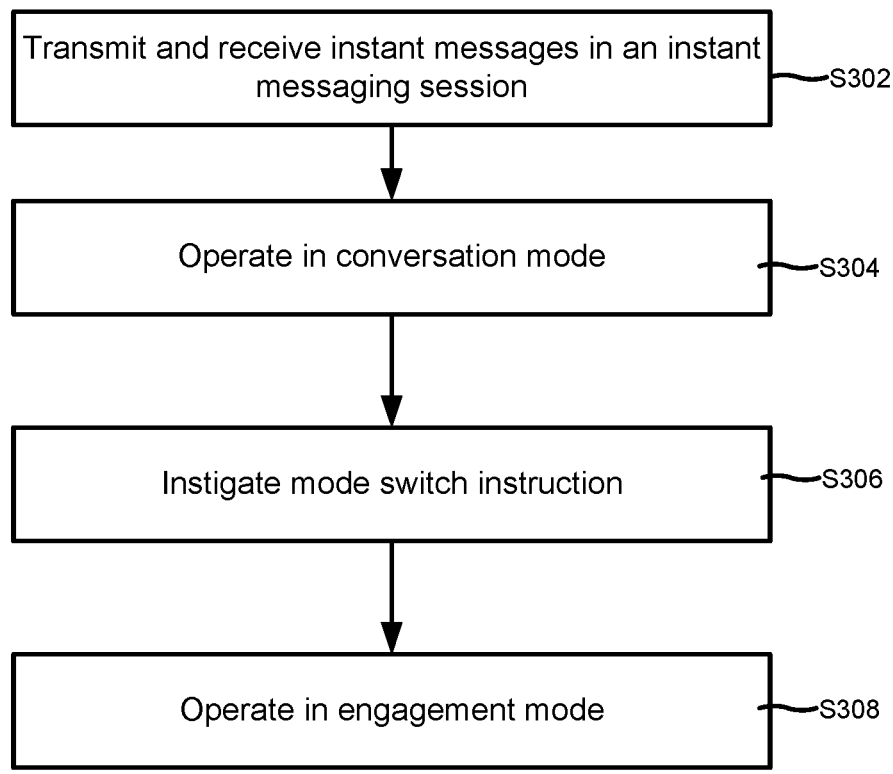
FIG. 3 is a schematic flow chart for an instant messaging communication method.
Figure 4A:
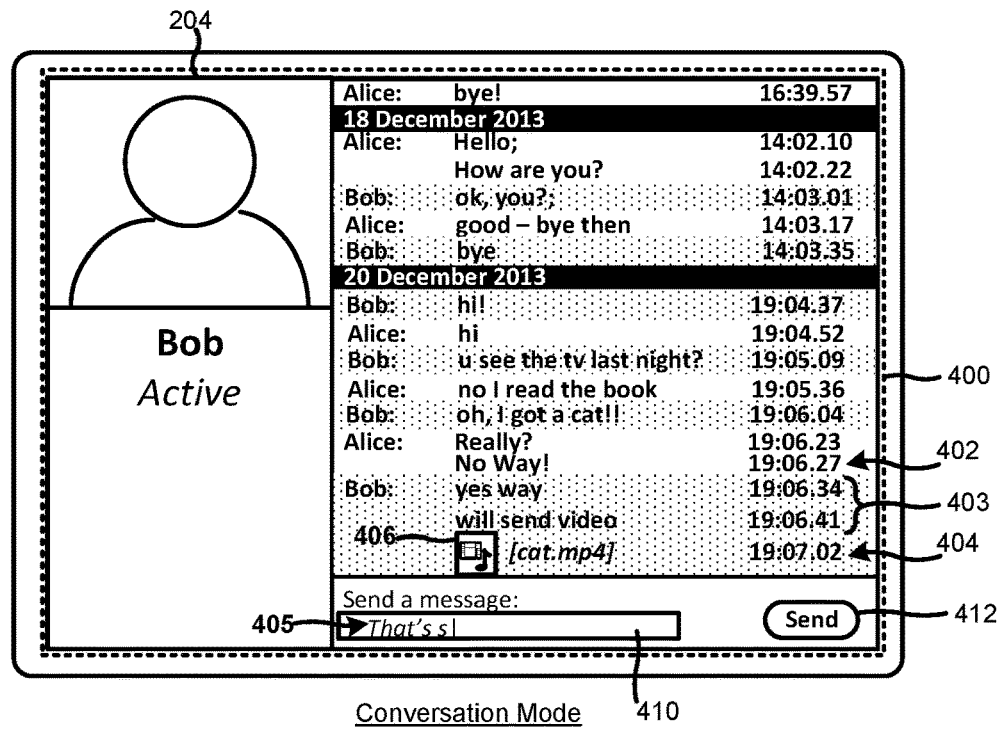
FIG. 4A is a schematic illustration of a communication client user interface operating in a conversation mode.
Figure 4B:
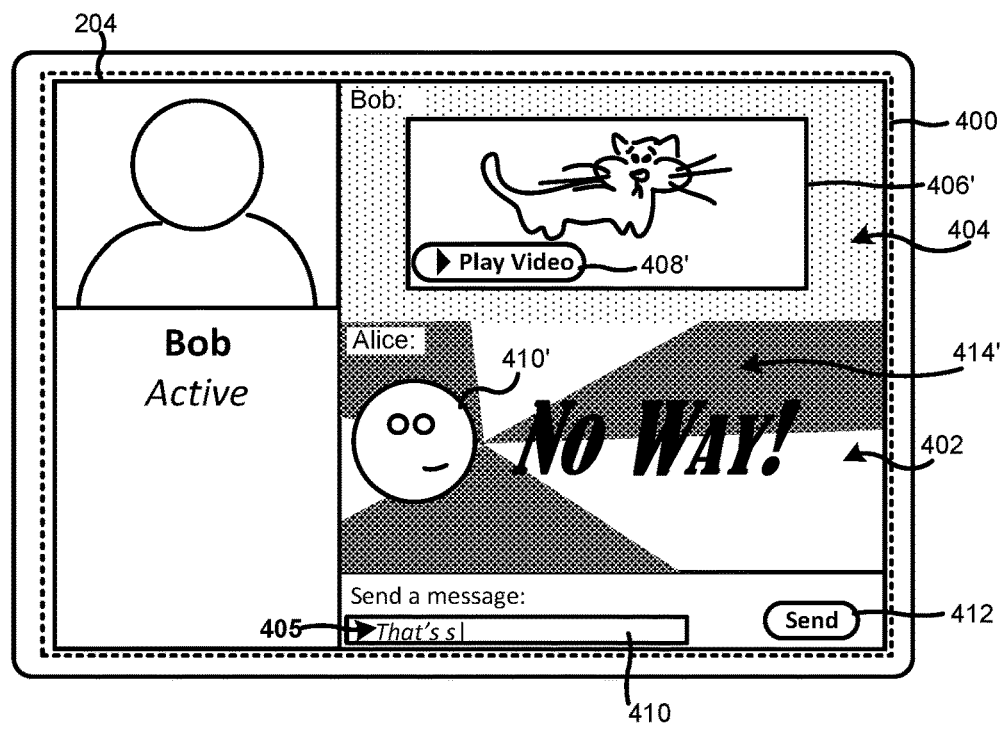
FIG. 4B is a schematic illustration of a communication client user interface operating in an engagement mode according to a first embodiment.
Figure 4C:
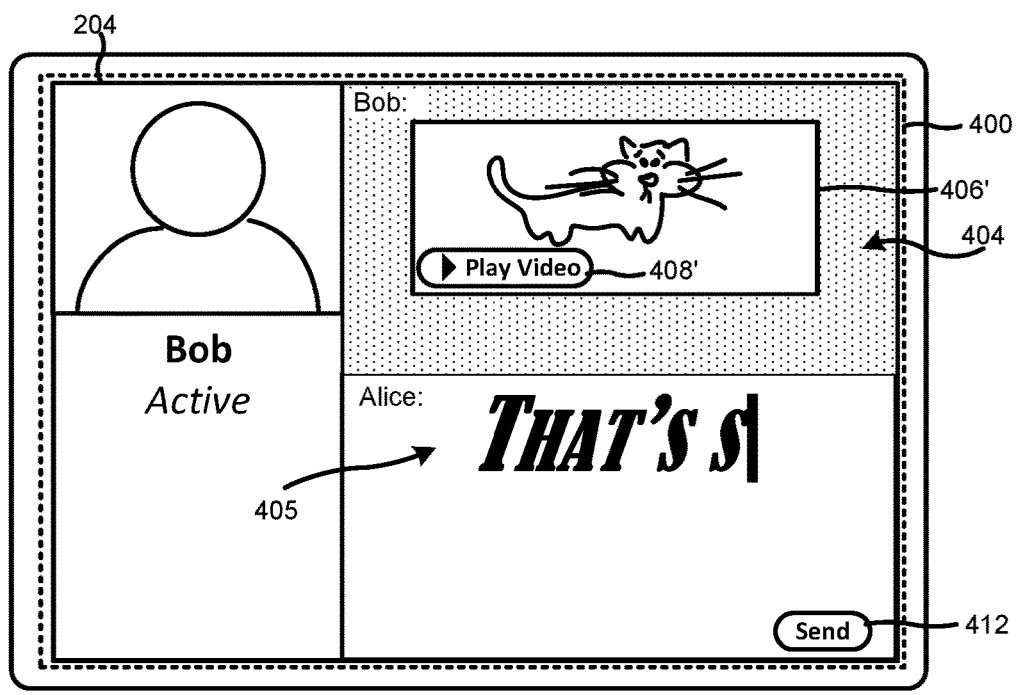
FIG. 4C is a schematic illustration of a communication client user interface operating in an engagement mode according to a second embodiment.

An instant messaging communication method will now be described with reference to FIG. 3 which is a flow chart for the method. Reference will also be made to FIGS. 4A, 4B and 4C which illustrate exemplary client user interfaces presented in various embodiments as part of the method.

At step S302 the users 102, 110 (Alice and Bob) engage in an instant messaging conversation whereby messages are transmitted and received between the first user device 104 and the second user device 112 in an instant messaging communication session. The messages constitute a sequence of messages of a conversation in which the users 102, 110 are participating by instigating transmission of new messages in response to receipt of received messages in the communication session. The messages are transmitted in both directions (that is from the first user device 104 to the second user device 110 and vice versa) with Alice 102 instigating transmission of new messages in response to receipt of received messages from Bob 110 and vice versa. The instant messaging conversation may include more than two users and the instant messages may be transmitted between any of the users in the conversation.

The instant messaging communication session may, for instance, be established between the user devices 104, 112 by Alice and Bob logging on at their respective clients 108, 114 and one of Alice and Bob instigating transmission of an initial message to the other, and then terminated by one or both of those users logging off at their respective clients 108, 114 and/or after a predetermined period of message inactivity during which no messages are being transmitted between the user devices 104, 112 in the established instant messaging communication session.

The messages in the communication session are transmitted over the network 106. They may be transmitted via a server connected to the network 106 between the first and second user devices 104 and 112. Alternatively or additionally, the messages of the communication session may be transmitted on a point-to-point route between the first and second user devices 104 and 112 (i.e. a route that does not go via any server in the communication system 100), as is known in the art. In order for the first user 102 to transmit a message via a point-to-point route to the second user 110, the first user device 104 retrieves the Internet Protocol address (IP address) of the second user device 112 from a server of the communication system 100 or from another node in the network 106 (such as another user device). The first user device 104 can then send messages direct to the IP address of the second user device 112 in the instant messaging session without sending the instant messages via any server.

The messages can contain text input by one user at their user device for transmission to the other user device. The client user interface is operable to display, in both the engagement mode and the conversation mode, text input by the user 102 (Alice) to be transmitted in a message of the instant messaging communication session but which has not yet been transmitted. Specifically, the client 108 displays via the client user interface a message field (410 in FIGS. 4A, 4B and 4C) into which Alice enter text 405 using the keypad 206. The client user interface displays a selectable send option 412 which Alice can select after inputting such text. In response, the client 108 creates a message containing the input text and transmits the created message via the network 106 to Bob's user device 112. Bob can then respond to Alice's message in a similar manner, or Alice can instigate transmission of a further message in a similar manner without Bob responding to Alice's earlier message.

In this embodiment, in addition to transmitting text-based messages, media messages can also be transmitted and received between the devices 104, 110 in the instant messaging communication session. A media message is a message containing audio data and/or image data, including video data and static image data as an alternative or in addition to text. For example, Alice may be able to choose a media file for transmission in a media message of the instant messaging communication session by 'dragging-and-dropping' the media file into the message field 410 from another application or from a window displayed by the operating system 314, or the client 108 may display via the client user interface a selectable media content option (not shown in FIGS. 4A, 4B, 4C) which can be selected in order to choose media content for transmission in a media message of the instant messaging communication session.

Files other than media files can also be selected for transmission in a message in the instant messaging communication session.

The transmitted and received messages are stored in the memory (computer storage) 212 of the user device 104. Each stored message has an associated timestamp indicating a time of transmission and/or a time of receipt. In this embodiment, a transmission-time timestamp is generated for each message prior to transmission and transmitted as part of that message. In alternative embodiments, a receipt-time timestamp may be generated for each message upon receipt and stored in association with the corresponding message.

At step S304, the user interface of client 108 operates in a conversation mode in which the transmitted and received messages are displayed in sequence. That is, messages transmitted from the user device 104 and messages received at the user device 104 in the instant messaging communication session are displayed in the temporal order in which they were transmitted and received relative to one another. An exemplary conversation mode is illustrated in FIG. 4A which shows the display 204 of the user device 104 when the client user interface is operating in the conversation mode. FIG. 4A shows transmitted and received messages of an instant messaging session taking place on an exemplary date of 20 Dec. 2014 between Alice and Bob 102, 110 as displayed on Alice's display 204. The client user interface displays content—including the transmitted and received messages—in an available area 400 of the display 204. As depicted in FIGS. 4A, 4B and 4C, the available area of the display is the whole of the display. However, it is envisaged that the available area of the display (that is the area available to the client 108) may constitute only a portion of the display e.g. with the remainder of the display being used by the operating system and/or other application(s) executed thereon to display other content. In this embodiment, older messages are displayed towards the top of the available display area 400 and newer messages are displayed towards the bottom of the available display area 400 but in alternative embodiments this could be reversed i.e. with newer messages displayed towards the top of the available display area 400 and older messages displayed towards the bottom of the display.

In the conversation mode, each message is displayed along with its corresponding time stamp and an indication as to which participant (i.e. Alice or Bob) that message originated from (i.e. the sender) as shown in FIG. 4A. For instance, messages originating with a particular participant may be displayed against a background colour or image unique to that participant and in conjunction with an identifier, such as a username, of the sender (as illustrated in FIG. 4A). In the example of FIG. 4A, the timestamps are displayed on the right-hand side of the available display area 400 (formatted as "hour: minute, second") with date headers also being displayed to partition the displayed messages according to date of transmission or receipt.

When a transmitted or received message contains text, that message is displayed by displaying that text of the message. When a transmitted or received message contains a media file such as an audio file—or a notification message indicating that the user 410 wishes to send a media file—a video file or image file, and icon 406 is displayed to represent that file in conjunction with a file name of the media file (such as "cat.mov" in FIG. 4A) in order to inform the user 104. As will be appreciated, this is just one example and there are many ways in which a message containing a media file (or a notification of a desired media file transmission) can be represented on the display in the conversation mode. Where a message contains a file other than a media file, it may be displayed in a similar manner although an icon other than the icon 406 may be displayed to distinguish the non-media file from a media file.

The media file may be transmitted to the user device 104 from the user device 110 responsive to the user 102 selecting an option to accept the file transfer in response to a notification message from the user device 110, or the file may simply be transmitted to the user device 104 without the user 102 being consulted.

In the example of FIG. 4A, the most recently transmitted message 402 (transmitted by Alice 102 to Bob 110) was transmitted at time 19:06.27 on 20 Dec. 2013; the most recently received message 402 (received from Bob by Alice) was received at time 19:07.02 on 20 Dec. 2013. In this example, the most recently transmitted message (transmitted by Alice) contains text entered into the message field 410 by Alice for transmission prior to Alice selecting the send option 412 to transmit that text to Bob; the most recently transmitted message 402 is displayed on Alice's display in the conversation mode by displaying that text. The most recently received message (received from Bob) contains a video file "cat.mp4", which is a video of Bob's new cat in this example, sent by Bob as part of the conversation with Alice; the most recently received message 404 is displayed on Alice's display by displaying the icon 404 and the file name "cat.mp4" in the manner described above.

The most recently received message (received by Alice) and most recently transmitted message (transmitted by Bob) may not be temporally adjacent—that is other messages may be transmitted or received between the most recently transmitted message and the most recently received message. When transmitted and received messages of the instant messaging communication session are displayed in sequence as in the conversation mode, these other messages are displayed in between the most recently received message and the most recently transmitted message. If the most recently received message is before the most recently transmitted message in the sequence of messages (as in the example of FIG. 4A), other messages—such as messages 403 in FIG. 4A—may be received by Alice in the time between transmission of the most recently transmitted message and receipt of the most recent received message. If the most recently transmitted message is after the most recently received message in the sequence of messages, other messages may be transmitted by Bob in the time between transmission of the most recently transmitted message and receipt of the most recent received message.

The example of FIG. 4A shows (part of) a "draft" message 405. That is, text which has been entered in the message field 410 by Alice in Response to Bob's last message 406, transmission of which has not yet been instigated by Alice selecting the send option 412 (that is, text which has not yet been transmitted to Bob).

At step S306, a mode switch instruction is instigated to change the mode of the client user interface from the conversation mode to an "engagement mode". The engagement mode is described in more detail below. Messages are displayed in the engagement mode in a manner tailored to a high level of user engagement in the instant messaging conversation (i.e. tailored to a situation in which the user 102 is paying close attention to the conversation and is not being distracted by other events).

The mode switch instruction is instigated automatically by the client 108. For instance, in one embodiment, the change in mode is instigated automatically by analysing Alice's activity at the user device 104. More specifically, Alice's behaviour is analyzed in order to detect a condition indicative of Alice's level of engagement in the conversation with Bob. The mode switch instruction is instigated in response to the client 108 determining that Alice's level of engagement in the conversation is sufficiently high to warrant such a switch.

This condition could, for instance, be based on a current frequency at which the messages of the instant messaging communication session are being transmitted and received between Alice and Bob. That is, the detected condition may be a detected frequency at which the messages are transmitted and received between the user device and the communication network. In this case, a higher frequency of message exchange is assumed to indicate a higher level of user engagement in the conversation and a lower frequency of message exchange is assumed to indicate a lower level of user engagement in the conversation. That is, for a higher frequency of message exchange, it is assumed that Alice's attention is more focused on the conversation (and that she is less distracted by events other than the conversation) than for a lower frequency of message exchange. Thus the condition could be one of the frequency of message exchange which is considered to indicate a sufficiently high level of engagement of Alice if it exceeds an upper threshold frequency (the client user interface thus switching to the engagement mode when the frequency of message exchange exceeds that threshold).

Alternatively or additionally, this condition could be based on a presence (or status) indicator of the user 102 (Alice). As is known in the art, a user's presence indicator provides an indication of that user's current situation (that is, a current user state), and may in particular provide an indication of their current availability. The presence indicator may for instance take a value of "online", "away", "busy" etc. indicating e.g. that the user is currently online and unoccupied, that the user is online but may be absent from their user device, and that the user is online but otherwise occupied respectively. This can be determined automatically by the client 108—for instance, a user's presence indicator can be set to "away" automatically if no user activity is detected at their user device for a certain amount of time and then returned to "online" upon detection of resumed user activity; similarly, the indicator could be set to "busy" when it is detected that the user is active at their user device but is currently interacting with an application running on the OS 214 other than the client 108 and/or if the other application is, for instance, currently in a full-screen mode (e.g. a video application currently displaying full screen video) and then returned to "online" when the user beings to interact with the client 108 and/or when they exit the full-screen mode. Thus the condition could be one of the user's presence status which is considered to indicate a sufficiently high level of engagement if it is e.g. "online" as opposed to "away" or "busy".

That is, in embodiments the detected condition is a presence status of the user, the presence status indicating a current state of the user. The client may be configured to set the presence status automatically by analyzing the user's activity at the user device. The user's presence status may indicate whether the user is online, away or busy.

Alternatively or additionally, this condition could be based on historic user data. For instance the client 108 could determine that Alice and Bob are "good" friends based on a suitable interaction metric which is applied to historic conversations that have occurred between them. That is, information about historic interactions between Alice and Bob, identifying a pre-existing relationship between Alice and Bob, is stored in the memory of the use user device; the client 108 accesses the memory to identify the pre-existing relationship and switches mode in response. For instance, the metric may be a function of a number of times (e.g. the number of days on which) Alice and Bob have exchanged messages in instant messaging communication sessions, participated in voice or video calls with one another etc. over the past e.g. several months. Thus the condition could be given by the current value of metric which is considered to indicate a sufficiently high level of user engagement if it exceeds a certain upper threshold. For instance, where the metric is defined as a number of historic interactions between Alice and Bob, the condition could be taken to indicate a sufficiently high level of user engagement if it exceeds an upper threshold number of historic interactions.

That is, in embodiments, information about at least one previous interaction between the user and another user is stored at the user device, the stored information identifying a relationship between the user and the other user. The instant messages are transmitted and received in the instant messaging session between the user device and at least another device associated with the other user via the communication network. The client is configured to access the computer storage to identify the relationship between the user and the other user from the stored information, responsive to which the client modifies the client user interface to operate in the engagement mode.

Further, the automatic switch may be based on a user's past manual switching behaviour. That is, the client may be further operable to enter and/or exit at least one of said modes responsive to a user input at the user device (i.e. the client may implement manual switching as well as automatic switching). Information about how often the user has previously chosen to enter and/or exit that mode is stored in memory 228, and this information (either explicitly or inherently) identifies a mode preference of the user. So, for instance, if in the past the user has elected to exit [resp. enter] the engagement mode (e.g. after the client has automatically entered it) one or more times, the client may increase [resp. decrease] the engagement threshold (e.g. message exchange frequency threshold) above which a switch to the engagement mode takes place (that is, the client may become more reluctant [resp. willing] to enter the engagement mode automatically) because the information inherently identifies that the user's preference leans towards [resp. away from] the conversation mode and away from [resp. towards] the engagement mode. Where the inherent or explicit user mode preference indicates an extreme distaste for one of the modes, the client may disable automatic switching to that mode altogether (but may still switch to the other of the modes automatically as appropriate in accordance with the above).

Thus, the client application may be responsive to user inputs at the user device to enable the user to control the user interface; the user device may comprise an access component for accessing computer storage configured to store information about previous control of the user interface by the user, the stored information identifying a user interface mode preference of the user; the client may be configured to access the computer storage to identify the user interface mode preference of the user from the stored information, responsive to which the client modifies the client user interface to operate in the other mode (one of the conversation or engagement mode).

It will be appreciated that the condition may be a multi-factorial condition consisting of multiple sub-conditions. For instance, the condition may be one of the user's current status and the frequency of message exchange, with the condition considered to indicate a sufficiently high level of engagement of Alice 102 to prompt the change of mode if the user is both "online" and the message exchange frequency is above an upper threshold.

In some embodiments, the mode switch instruction can also be instigated manually by Alice 102. That is the mode switch instruction can also be instigated responsive to a user input at the user device 104. The user input may, for instance, be a swipe or gesture detected by a input device of the user device. The input device may be e.g. a touchscreen of the user device 104, the camera 208, or another sensor of the device such as an infra-red-based depth sensor or similar.

For example, the user input may be a touch-based pinch gesture. Alternatively or additionally, the client 108 may display a mode-switch option via the client user interface (not shown), responsive to selection of which the client changes the mode from conversation to engagement.

In embodiments, the operating system 214 receives and processes (lower level) user input data from the input device and supplies the (higher level) processed user input data to the client application 108. The client 108 then performs the automatic identification of the most recently received message 402 in memory 228 and the modification of the client user interface to the engagement mode responsive to the (higher level) processed input data. Thus it is the client application—and not the operating system on which it runs—which instigates the modification of the client user interface (in contrast to, say, the operating system merely 'zooming in' by enlarging an area of an output image currently shown on the display in response to a user input which would not involve, or be caused by, the client application).

At step S308, in response to the mode switch instruction, the client 108 modifies its user interface to operate in the engagement mode. In the engagement mode, the most recently received message in the sequence of messages sent between Alice and Bob is automatically identified by the client 108 and displayed; at most one additional message of the sequence is also displayed—other messages of the sequence are not displayed.

An exemplary engagement mode according to a first embodiment is illustrated in FIG. 4B which shows the display 204 of the user device 104 when the client user interface is operating in the engagement mode according to the first embodiment. In the first embodiment, the most recently received message is displayed and an additional message of the sequence is displayed, the additional message being the most recently transmitted message in this first embodiment. The additional message and the most recently received message are displayed in contiguous portions of the available display area 400 in the engagement mode in this embodiment.

In the engagement mode according to the first embodiment, the most recently received message 402 (by Alice from Bob) is displayed. This received message is automatically identified in the memory 228 by the client 108 from the timestamps stored in the memory 228 in association with each of the messages received from Bob's user device 112. The most recently transmitted message 404 (from Alice to Bob) is also displayed. This transmitted message is, again, automatically identified in the memory 228 by the client 108 from the timestamps stored in the memory 228 in association with each of the messages transmitted from Alice's user device 104.

When a new message is received (resp. transmitted) whilst the user interface is operating in the engagement mode, the currently displayed received message 404 (resp. currently displayed transmitted message 402) replaced with that newly received (rep. newly transmitted message). The transition from the currently displayed to the newly displayed message may be animated (e.g. by a translational, rotational or cross-fade animation effect).

Only these two messages are displayed—other transmitted and received messages of the sequence are not displayed. The two displayed messages 402, 404 respectively occupy greater respective portions of the available display area 400 in the engagement mode than in the conversation mode. That is the most recently transmitted message 402 occupies a greater portion of the available display area 400 when displayed in the engagement mode than when displayed in the conversation mode, and the most recently received message 404 occupies a greater portion of the available display area 400 when displayed in the engagement mode than when displayed in the conversation mode. When a message displayed in the engagement mode contains text, that text could, for instance, be displayed at a larger text size in the engagement mode than in the conversation mode.

The messages 402, 404 displayed in the engagement mode are displayed as "rich media" messages. A message is displayed as a "rich media" message by displaying additional media pertaining to that message—such as video(s) and/or image(s)—in the engagement mode which is not displayed in the conversation mode. This facilitates the creation of desired visual effects which are appropriate in the engagement mode as there is a larger portion of the display area dedicated to displaying the messages 402, 404 than in the conversation mode.

For example, at least part of the additional media may be stored in the memory 228. For instance, for a message containing text, the client 108 may select media (e.g. audio and/or video) from media stored in the local memory 228 of Alice's user device 104 and display the selected media in conjunction with the message text itself. For instance, in the example of FIG. 4B the client selects additional media elements 409' and 414' which it displays in conjunction with the text of the most recently transmitted message 402 in the engagement mode (but not in the conversation mode). These may be (static) image elements or video elements. The media element 409' is displayed as a graphic (moving or static) alongside the text of the message 410 in the engagement mode; the media element 414' is displayed as a background image or video which appears behind the message text and the graphic 409'.

In this embodiment, the client is configured to process the at least one message and to access the computer storage to select the stored additional media based on said processing. For example, in FIG. 4B, the media elements 408', 409' are selected by the client 108 based on the text of the message 402 in order to complement that text e.g. by the client 108 performing a text recognition procedure on the text of the message whereby certain predetermined words and/or characters of that text are recognized as being mapped to respective corresponding media elements in memory 228 and those media elements are selected by the client 108 for display in the engagement mode in conjunction with the message text.

A message containing text may alternatively or additionally be displayed as a rich media message by displaying that text in the engagement mode using a font other than that used to display that text in the conversation mode (such that different font images are used to represent respective characters of that text in the engagement mode than those used in the conversation mode), as illustrated in FIG. 4B for the last message 402 sent from Alice to Bob.

As another example, a media message (that is a message containing media such as static image and/or video file(s)) may be displayed as a "rich media" message by extracting and displaying some or all of the media content of that message in the engagement mode which is not displayed in the conversation mode—e.g. where a media message contains static image(s), one or more of those images may be displayed in the engagement mode which are not displayed in the conversation mode; where a media message contains video(s), one or more of those videos, or at least one or more (static) video frames thereof, may be displayed in the engagement mode which are not displayed in the conversation mode. For instance, in the example of FIG. 4B, the last received message 404 (by Alice from Bob) contains the video "cat.mp4" of Bob's new cat—the message 406' is displayed in the engagement mode by displaying a static video frame 406' extracted from that video (which is used to represent that video in the engagement mode instead of the icon 406 used to represent that video in the conversation mode). A selectable play option 408' is also displayed in conjunction with the video frame 406', responsive to selection of which the client 108 begins playing the video 406 via the client user interface e.g. in a portion of the available display area 400 which is substantially the same as that used to display the video frame 406. That is, the video is played out by the client 108 itself rather than by a separate application running on the OS 214.

When a media file contains an audio file, that audio file may for instance be displayed as a rich media message in the engagement mode by displaying a waveform representation of that audio along with a selectable play option, responsive to selection of which the client 108 plays out the audio via the loudspeaker 210.

An exemplary engagement mode according to a second embodiment is illustrated in FIG. 4C which shows the display 204 of the user device 104 when the client user interface is operating in the engagement mode according to the second embodiment.

In this embodiment, the most recently received message 404 is automatically identified by the client 108 and displayed in the engagement mode as in the first embodiment. However, as shown in FIG. 4C, no additional message of the sequence of already transmitted and received messages (e.g. the most recently transmitted message 402) is necessarily displayed; rather the draft (that is yet-to-be transmitted) message 405 is displayed instead (that is, any text 405 that has been entered by Alice to be transmitted to Bob for which Alice has not yet instigated transmission by selecting the send option 412 is displayed instead). The input text of the draft message is enlarged in the engagement mode relative to the conversation mode—that is, the text of the draft message occupies a greater portion of the available display area 400 in the engagement mode than in the conversation mode in the second embodiment.

According to the second embodiment, when there is no draft message to display (e.g. because Alice has not yet entered any new text to be transmitted to Bob since transmission of the last message in the sequence of messages from Alice to Bob), the most recently transmitted message may optionally be displayed instead. Again, the most recently transmitted message, when so displayed, is displayed as in the first embodiment, occupying a greater portion of the available displayed area 400 in the engagement mode than in the conversation mode.

The engagement mode is thus tailored to a situation in which Alice is highly engaged in the conversation with Bob such that Alice is more likely to view each received message of the conversation as soon as it arrives and to respond quickly such that the conversation takes place over a shorter interval of time. Thus Alice has a lesser need for a linear conversation history as shown in the conversation mode in that event as she is more likely to retain the conversation in her own head. In contrast, the conversation mode is tailored to a situation in which Alice is not highly engaged in the conversation wherein she is less likely to view each received message as soon as it arrives and to leave longer before responding such that the conversation takes place over a longer interval of time. Thus, Alice has a greater need for the linear conversation history as shown in the conversation mode in that event as she is less likely to retain the conversation in her own head.

The client 108 is operable to revert back to the conversation mode from the engagement mode responsive to a further mode switch instruction. The change may be automatic—for instance when Alice's level of engagement is detected as being sufficiently low to warrant a switch back to the conversation mode—or responsive to a user input from Alice.

In both the first and second embodiments, the messages (both transmitted/received messages and also "draft" messages) which are displayed in the engagement mode as described represent "default" messages in that they are automatically displayed upon entering the engagement mode, this does not preclude subsequent selections of different messages being made either automatically by the client and/or manually in the engagement mode to be displayed in place of either or both of the two messages displayed by default in the engagement mode.

As will be appreciated, whilst the subject matter is described above with reference to specific embodiments, these are exemplary and variations are envisaged. For instance, whilst in the above all of the displayed messages are displayed as rich media messages in the engagement mode, alternatively none or only one of the messages may be displayed as rich media messages. Further, whilst in embodiments (such as the first embodiment described above) the most recently received message and one additional message of the sequence are displayed in the engagement mode in substantially contiguous portions of the display area, in other embodiments they may be displayed in non-contiguous portions of the available display area.

Moreover, whilst in the first described embodiment the most recently received message of the sequence is displayed above the additional message in the engagement mode, alternatively the additional message of the sequence may be displayed above the most recently received message in the engagement mode. Similarly, whilst in the second described embodiment the most recently received message of the sequence is displayed above the draft message in the engagement mode, alternatively the draft message may be displayed above the most recently received message in the engagement mode. Further, whilst in the above described first embodiment, the most recently received message and the additional message of the sequence are displayed in the engagement mode such that one is above the other on the display, in alternative embodiments these be displayed side-by-side. Similarly, whilst in the second embodiment, the most recently received message of the sequence and the draft message are displayed one above the other, these may alternatively be displayed side-by-side. Further, whilst in the first embodiment described above, the additional message of the sequence of transmitted and received messages is the most recently transmitted message in alternative embodiments for which the additional message of the sequence is displayed, that message may not be the most recently transmitted message and may be another message instead.

Further, whilst in the above an instant messaging session is between two user devices, alternatively an instant messaging session may be between more than two user devices. And whilst in the above an instant messaging conversation is conducted between two users, more than two users may participate in an instant messaging conversation. There may be more user devices in the communication session than there are users in the conversation e.g. if one more participating users are using more than one user device to participate in the conversation.

Further, whilst in the above the subject matter is implemented by client application in the form of a communication client application dedicated primarily to enabling users to conduct communication events with one another, the client may alternatively be an application such as a web browser (such as Internet Explorer®, Firefox®, Chrome™ etc.) and that same (or similar) functionality may be implemented within that browser e.g. effected by way of a suitable browser plugin.

Further, whilst in the above, at most two transmitted and/or received messages of the sequence are transmitted in the engagement mode, in general this may or may not be the case and more than two transmitted and/or received messages of the sequence may be displayed in the engagement mode. For instance, in an n-way (n=2, 3, 4, 5 . . . ) way messaging scenario, three messages may be displayed in the engagement mode—one for each participant. In general, fewer messages may or may not be displayed in the engagement mode than are displayed in the conversation mode. Moreover, in other embodiments, only a number (e.g. 1 or 2) of messages of the sequence may be displayed in their entirety, but one or more other additional messages of the sequence may be only partially displayed (such that only some of the content of each of those messages is displayed). For instance, where the most recently received message is received in its entirety, part (e.g. the final line of text) of the next most recent message may also be displayed e.g. at lower opacity than the most recently received message in order to create a visual effect to indicate the existence of earlier received messages.

Further, whilst in the above, transmitted and received instant messages (and possibly media for display in the engagement mode and/or historic user data) are stored locally at the user device, some or all of these messages (and/or media and/or historic data) may alternatively or additionally be stored external to the user device e.g. at one or more servers and/or datacentres of the network 106. In this case, the client may access those messages remotely. It should be noted "an access component for accessing computer storage" of a user device covers remote and/or local access functionality—that is, the access component may be for accessing local computer storage at the user device and/or for accessing remote computer storage e.g. via a network.

Further, whilst the above considers an engagement mode in which each message displayed therein occupies a larger proportion of the available display area than it occupies in the conversation mode, the disclosure also considers an alternative engagement mode in which this may or may not be the case. In this case, the client may be configured to display at least one of the messages in the engagement mode as a rich media message by displaying additional media pertaining to that message in the engagement mode which is not displayed in the conversation mode (and the rich media message may or may not be enlarged in the engagement mode relative to the conversation mode). Corresponding alternative methods and computer program products are also envisaged.

That is, the disclosure considers an alternative user device comprising a display; a network interface configured to transmit and receive messages between the user device and a communication network in an instant messaging communication session, the messages constituting a sequence of messages in which a user of the user device is engaged by instigating transmission of new messages in response to receipt of received messages in the communication session; and one or more processors configured to run a client application having a user interface configured to operate in a conversation mode to display one or more of said messages, the client application configured responsive to a mode switch instruction to modify the client user interface to operate in an engagement mode to display one or more of said messages, whereby at least one of the messages is displayed in the engagement mode as a rich media message by displaying additional media pertaining to that message in the engagement mode which is not displayed in the conversation mode.

Further, in the above a user device comprises: a display having an available display area; a network interface configured to transmit and receive messages between the user device and a communication network in an instant messaging communication session, the messages constituting a sequence of messages in which a user of the user device is engaged by instigating transmission of new messages in response to receipt of received messages in the communication session; one or more processors configured to run a client application having a user interface configured to operate in a conversation mode to display one or more of the messages in the available display area, the client application configured to detect a condition indicative of the level of engagement of the user by analyzing the user's activity at the user device and responsive to the detected condition to modify the client user interface to operate in an engagement mode to display one or more of the messages, whereby the displayed messages in the engagement mode occupy a larger proportion of the available display area than in the conversation mode. However, an automatic switch may equally occur in the opposite direction i.e. an automatic switch from the engagement mode back to the conversation mode. For instance this may occur when the frequency of message exchange drops below a threshold value (either the same threshold above which the switch from the conversation mode to the engagement mode occurs, or a different threshold) and/or after a predetermined period of inactivity by the user 102 at the user device 104.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations (such as the method steps of FIG. 3), e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more processors; and
one or more computer-readable storage devices storing instructions that are executable by the one or more processors to perform operations including:
exchanging messages over a network via a software application that is operable to switch between a conversation mode and an engagement mode, the conversation mode and the engagement mode each representing different respective modes for presenting a message and the engagement mode providing a larger portion of an available display area for the message than the conversation mode;
detecting a user behavior indicating a level of engagement of a user relative to the application and based on one or more input signals detected by the system, the user behavior being independent of a user selection to select an option to switch between the conversation mode and the engagement mode; and
switching, automatically and based on the detected user behavior, the application from the conversation mode to the engagement mode.

2. The system as described in claim 1, wherein the user behavior comprises a frequency at which the messages are exchanged between a first user and a second user that are involved in exchanging the messages.

3. The system as described in claim 1, wherein the user comprises a user of a device on which the application is executing, and the level of engagement is further based on a presence status of the user.

4. The system as described in claim 1, wherein the user comprises a user of a device on which the application is executing, wherein the level of engagement is further based on historic user data that indicates historic interactions between the user and a different user that are involved in exchanging the messages.

5. The system as described in claim 1, wherein the user comprises a user of a device on which the application is executing, and the level of engagement is further based on a pre-existing relationship between the user and a different user that are involved in exchanging the messages.

6. The system as described in claim 1, wherein the level of engagement is further based on one or more past manual switches between the conversation mode and the engagement mode.

7. The system as described in claim 1, wherein the message comprises media content including one or more of an image, video content, or audio content, and wherein the engagement mode presents additional media of the media content in comparison with the conversation mode.

8. The system as described in claim 1, wherein said switching is based on the level of engagement exceeding an engagement threshold, and wherein the operations further comprise:
detecting a further user behavior in relation to a switch between the conversation mode and the engagement mode; and
adjusting the engagement threshold based on the detected further user behavior.

9. A method comprising:
exchanging messages over a network via a software application that is operable to switch between a conversation mode and an engagement mode, the conversation mode and the engagement mode each representing different respective modes for presenting a message and the engagement mode providing a larger portion of an available display area for the message than the conversation mode;
detecting a user behavior indicating a level of engagement of a user relative to the application and based on one or more input signals detected by a system, the user behavior being independent of a user selection to select an option to switch between the conversation mode and the engagement mode; and
switching, automatically and based on the detected user behavior, the application from the conversation mode to the engagement mode.

10. The method as recited in claim 9, wherein the user comprises a user of a device on which the application is executing, and wherein the user behavior comprises a frequency at which messages are exchanged between the user and a different user that are involved in exchanging the messages.

11. The method as recited in claim 9, wherein the user comprises a user of a device on which the application is executing, and wherein the level of engagement is further based on one or more of a presence status of the user, historic user data that indicates historic interactions between the user and a different user that are involved in exchanging the messages, or a pre-existing relationship between the user and a different user that are involved in exchanging the messages.

12. The method as recited in claim 9, wherein the level of engagement is further based on one or more past manual switches between the conversation mode and the engagement mode.

13. The method as recited in claim 9, wherein the message comprises media content including one or more of an image, video content, or audio content, and wherein the engagement mode presents additional media of the media content in comparison with the conversation mode.

14. The method as recited in claim 9, wherein said switching is based on the level of engagement exceeding an engagement threshold, and wherein the operations further comprise:
detecting a further user behavior in relation to a switch between the conversation mode and the engagement mode; and
adjusting the engagement threshold based on the detected further user behavior.

15. One or more computer-readable storage devices storing instructions that are executable by one or more processors to perform operations including:
exchanging messages over a network via a software application that is operable to switch between a conversation mode and an engagement mode, the conversation mode and the engagement mode each representing different respective modes for presenting a message and the engagement mode providing a larger portion of an available display area for the message than the conversation mode;

detecting a user behavior indicating a level of engagement of a user relative to the application and based on one or more input signals detected by a system, the user behavior being independent of a user selection to select an option to switch between the conversation mode and the engagement mode; and switching, automatically and based on the detected user behavior, the application from the conversation mode to the engagement mode.

16. One or more computer-readable storage devices as recited in claim 15, wherein the user comprises a user of a device on which the application is executing, and wherein the user behavior comprises a frequency at which messages are exchanged between the user and a different user that are involved in exchanging the messages.

17. One or more computer-readable storage devices as recited in claim 15, wherein the user comprises a user of a device on which the application is executing, and wherein the level of engagement is further based on one or more of a presence status of the user, historic user data that indicates historic interactions between the user and a different user that are involved in exchanging the messages, or a pre-existing relationship between the user and a different user that are involved in exchanging the messages.

18. One or more computer-readable storage devices as recited in claim 15, wherein the level of engagement is further based on one or more past manual switches between the conversation mode and the engagement mode.

19. One or more computer-readable storage devices as recited in claim 15, wherein the message comprises media content including one or more of an image, video content, or audio content, and wherein the engagement mode presents additional media of the media content in comparison with the conversation mode.

20. One or more computer-readable storage devices as recited in claim 15, wherein said switching is based on the level of engagement exceeding an engagement threshold, and wherein the operations further comprise:

detecting a further user behavior in relation to a switch between the conversation mode and the engagement mode; and adjusting the engagement threshold based on the detected further user behavior.

* * * * *